Aug. 2, 1949.   R. C. DALL   2,477,725
WARNING DEVICE
Filed June 1, 1946   2 Sheets-Sheet 1
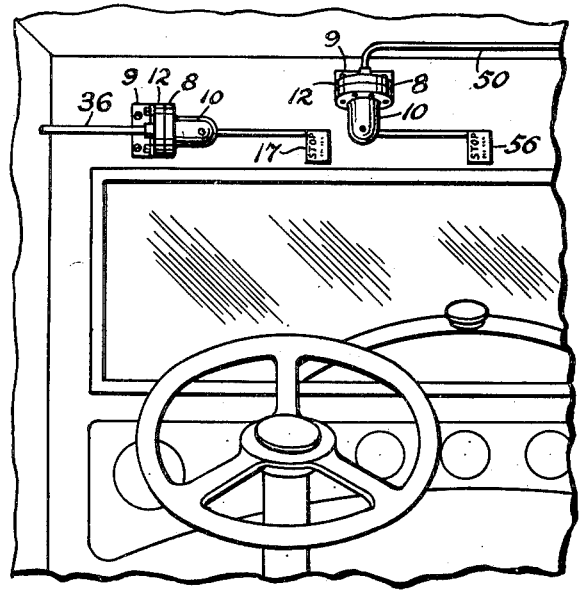
Fig.1.
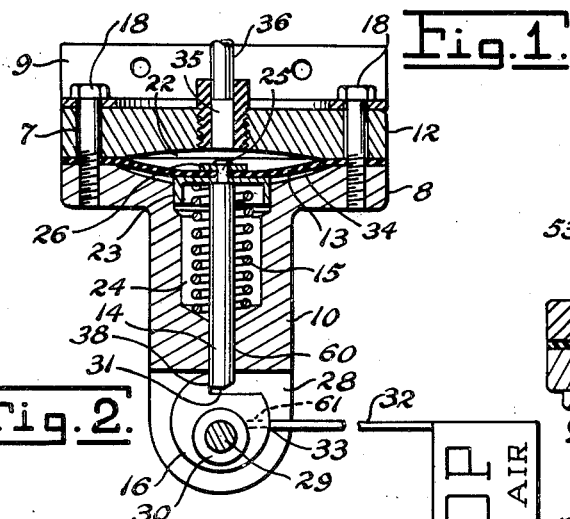
Fig.2.
Fig.3.
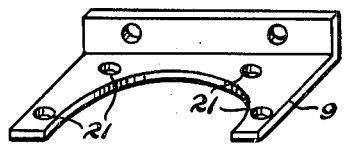
Fig.4.
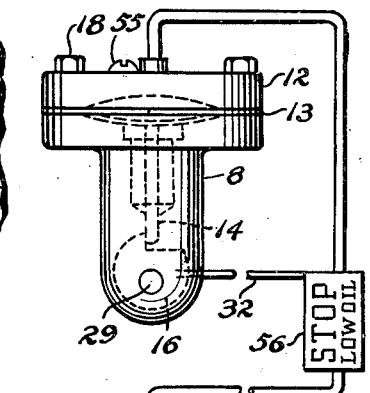
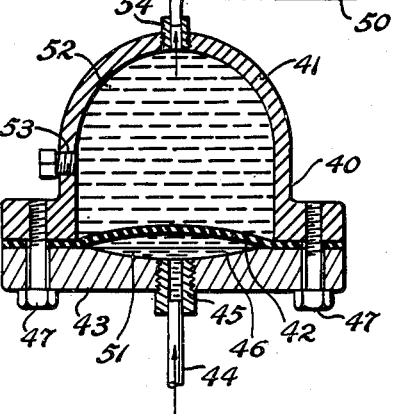
Fig.5.
INVENTOR.
Robert C. Dall
BY Zugelter & Zugelter
Attys.

Aug. 2, 1949.　　　　R. C. DALL　　　2,477,725
WARNING DEVICE
Filed June 1, 1946　　　　　　　　2 Sheets-Sheet 2

INVENTOR.
Robert C. Dall
BY Jugelter & Jugelter
Attys.

Patented Aug. 2, 1949

2,477,725

UNITED STATES PATENT OFFICE 2,477,725

WARNING DEVICE

Robert C. Dall, Cincinnati, Ohio

Application June 1, 1946, Serial No. 673,786

9 Claims. (Cl. 116—114)

This invention relates to warning devices for use on automotive vehicles or other equipment wherein subnormal air or fluid pressure constitutes a danger.

One of the objects of this invention is to provide a highly serviceable warning device of simple construction, that will positively attract the attention of the operator whenever air or other fluid pressure becomes dangerously low.

Another object is to provide a device of the character described having a flag-like warning element oscillating in the line of vision of the operator when the point of danger is reached.

Another object is to provide a warning device which is positive of action, durable of construction, and simple and inexpensive to manufacture and install upon a vehicle. The device is constructed, moreover, to require no servicing or adjustments.

These and other objects and advantages are attained by the means described in the following specifications and illustrated upon the accompanying drawings, in which:

Fig. 1 is a view of the operator's section of a vehicle showing alternative modes of installing the warning devices.

Fig. 2 is a view of the body of the warning device in cross section.

Fig. 3 is a top plan view of the warning device.

Fig. 4 is a perspective view of a supporting bracket.

Fig. 5 is a plan view of the warning device in connection with a pressure transmitter for use with fluid pressure, the pressure transmitter being shown in cross-section.

Figure 6:
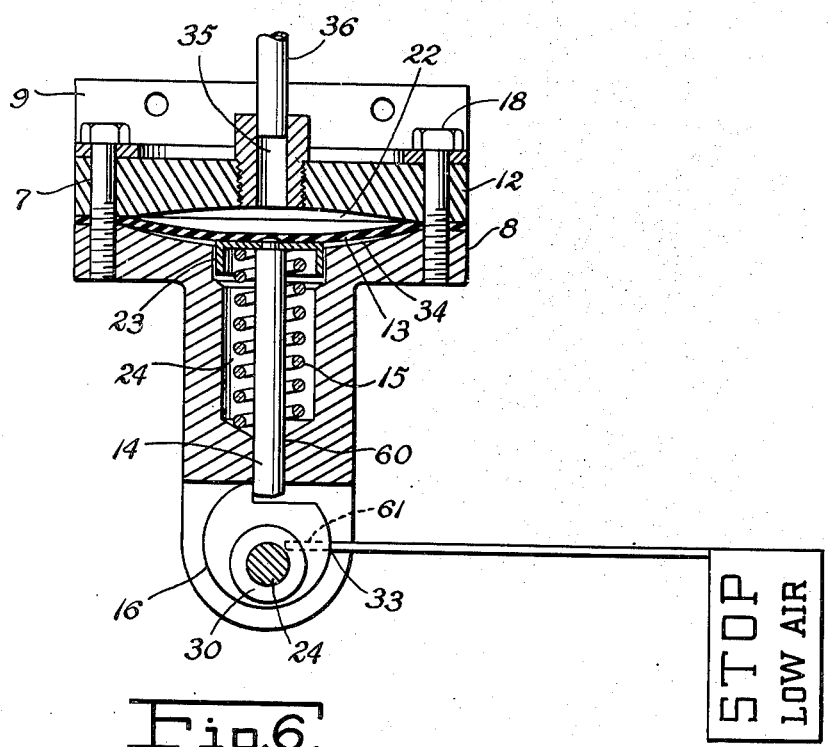
Figure 6 is a view in cross-section of a warning device of differing internal construction.

While it is common practice to use a pressure gage for indicating the degree of air or other fluid pressure at a supply source on automotive vehicles and other equipment, a gage of this character must be viewed constantly by the operator in order to note when the pressure has reached the point of danger. This obviously is a disadvantage since his eyes must leave the road from time to time in order to be on the alert for low pressures, such distractions constituting a hazard to safe driving.

The present invention obviates the necessity of the driver's constantly viewing the pressure gages, with its attendant hazards, by means of an ingenious arrangement whereby a warning notice falls in his line of vision to warn him of impending danger of brake or motor failure through low air, liquid, or oil pressure.

As illustrated by Fig. 2, the warning device 8 comprises a body 10 and a base 12, and between these parts is clamped a flexible diaphragm 13. The base is adapted for attachment to a support, as by means of a bracket 9 (Fig. 4). Within a longitudinal bore of the body is housed a latch or plunger 14, and a spring 15, the spring tending always to retract the latch or plunger in an upward direction, or toward the base member 12.

Diaphragm 13, which may be of rubber-like material, rubberized fabric, or flexible composition material suitable for use as a flexible partition, is mounted between the body and the base and may be clamped between those parts in any suitable manner. By way of example, a series of screws 18 is shown for this purpose, the screws passing through smooth bores 7 in the base 12 and having their threaded ends engaged with correspondingly threaded bores in the flange 8 of the body. The screws may pass through marginal portions of the diaphragm, as shown, and will preferably serve as a means of mounting the bracket 9 upon the base member 12. For this purpose, the bracket may be furnished with holes 21 (Fig. 4), through which the screws may pass.

To provide for free movement of the diaphragm between the base and the body members of the device, concavities are formed therein at the locations 22 and 34. At approximately its center point, the diaphragm may be fixed to the end 25 of the reciprocable plunger 14, so that movements of the diaphragm will be transmitted to the plunger. Any suitable form of connection between the diaphragm and the plunger end may be employed, although as illustrated in the drawing by way of example, the diaphragm is pierced to receive the reduced end 25 of the plunger, the latter being peened upon a washer 26 overlying one face of the diaphragm. The opposite or under face thereof may be supported upon a fixed cup or head 23 of the plunger, which cup or head is slidable in an enlarged upper section of the body bore 24 to perform as a guide while the lower end of the plunger shifts longitudinally within the reduced bore 60.

As will become apparent upon further explanation, fixation of the plunger to the diaphragm may be dispensed with, if desired, since with fluid pressure acting to force the diaphragm toward the plunger, and spring pressure acting to force the plunger toward the diaphragm, these parts will always remain in contact and will move in unison. In Figure 6 is shown a warning device in which the diaphragm is not attached to the plunger 14. In this embodiment of the invention the cup 23 is attached to the end of the plunger 14, and the cup 23 is held against the diaphragm 13 by the spring 15. Fluid under pressure is directed to the diaphragm through a pipe or tube 36, as will presently be explained.

At the lower end of the body 10 is formed a slot or recess 28, adapted to receive the cam 16, which is mounted upon a pivot pin 29 that spans the slot or recess. Washers 30 may be provided for reducing the friction between the faces of the cam and the sides of the slot. The staff 32 of the warning signal or flag 17 is fixed to the cam at 33 in any suitable manner, as by inserting the end of the staff in a bore 61 formed in the periphery of the cam.

The following is a description of the operation of this device when used in conjunction with an air brake system. Fluid under pressure is conducted to the diaphragm through the port 35 which connects with an air pressure line at some convenient point through the tube or pipe 36. It will be appreciated that sufficient pressure against the diaphragm in the air chamber 22 will keep the plunger 14 advanced downwardly sufficiently to maintain the end 31 of the plunger latched in engagement with the notch or abutment 38 of the cam, thereby holding the flag 17 in a horizontal position above the windshield, and out of the line of vision of the operator, where it remains as long as pressure in the system is sufficient to maintain the vehicle brakes in safe operative condition. But as soon as the air pressure in the chamber 22 is reduced to the danger point, the spring 15 urges the plunger 14 upwardly and retracts the end 31 from the notch or abutment 38 of the cam 16, permitting the weight of the flag to rotate the cam about its pivot 29, thereby causing the flag to oscillate, pendulum-like, in the line of the operator's vision as a warning signal that the fluid pressure in the system is insufficient for safe brake control. The flag, being mounted on the freely rotating cam, will continue its oscillation, aided by movements of the vehicle. The flag 17 may be inscribed with a suitable warning, such as "Stop—Low Air."

The fluid in the system above described may be either a liquid or a gas under pressure, air being preferred in most instances.

It will be appreciated that when the flag staff 32 is in a horizontal position, it will be out of the range of the operator's vision and when so disposed, gives the operator definite assurance that the air pressure in the braking system of the vehicle is of a sufficient value for safe braking. This relieves the operator of the necessity of continually viewing the pressure gages for a warning that pressure is low, thus enabling him to devote all his attention to the road ahead, a definite advantage in the interests of safe driving. The instant the flag drops before his eyes, the operator knows that a dangerous condition exists, a warning to him to take immediate steps to correct the defects in the pressure system. After this is done, the warning flag may be reset to the inoperative or horizontal position, as shown in the drawings, by simply swinging it upwardly about the pivot 29 until the end of the plunger 14 again engages the notch 38 of the cam 16. The periphery of the cam is made volute for this purpose.

The present invention as hereinbefore disclosed may be used in connection with either air or fluid pressure. If used with the lubricating system of an internal combustion engine to warn of low oil pressure, it may be desirable to provide a pressure transmitter 40, as shown in Fig. 5, the purpose of which is to maintain a closed oil line near the source of supply and transmit the pressure thereof to the warning signal 8 through the tube or pipe 50. The transmitter 40 is suitably installed on or near the engine, as by means of a bracket, and connected with the oil pressure system through the tube or pipe 44. The transmitter comprises the housing 41, the diaphragm 42 and the base plate 43, the inner face of which is concaved, as at 46, to form a chamber 51 between the diaphragm and said base plate for the reception of oil under pressure entering through the port 45. The chamber 52 in the housing 41 is filled, through the filler hole 53, with a suitable liquid. The diaphragm 42, which consists of rubber or other flexible oil and waterproof material, is mounted between the housing 41 and the base plate 43 and tightly sealed, as by means of the screws 47. When oil under pressure is maintained in the chamber 51, it urges the diaphragm upwardly and maintains a pressure of liquid in the chamber 52, pipe 50, and the chamber 22 of the warning device 8, where the identical action takes place as previously disclosed in the description of said warning device. A bleeder valve 55 may be installed in the base plate 12 for the release of air when the chamber 52 is filled with liquid. The warning flag 56 may be inscribed with a suitable warning, such as "Stop—Low Oil."

Should the oil pressure in the engine lubricating system reach a subnormal value, the operator is warned of this condition by the dropping of the flag 56 in his line of vision. After he has rectified the trouble he merely pushes the flag upwardly until the plunger or latch 14 engages the notch 38 of the cam 16, where the flag remains, ready at all times to warn the operator of recurrent oil pressure failures.

At the left of Fig. 1, the body of the warning device is supported horizontally, rather than vertically, the only change required for supporting it horizontally being that of bending the flag staff ninety degrees downwardly at the location 33 of Fig. 2, so that the staff normally will be disposed in substantial axial alignment with the plunger. Various other modifications and changes in structural details of the device may be made, within the scope of the appended claims without departing from the spirit of the invention. As previously stated herein, the connection between the plunger and the diaphragm may be dispensed with, if desired, and the manner of clamping the diaphragm between the body and the base is a matter of immateriality to the invention. Bracket 9 may be altered as necessary, to meet varying conditions of installation, as will be understood.

What is claimed is:

1. A warning device comprising in combination, a body having a longitudinal bore and an enlarged end, a projecting end including a pivot, and a base to cover the enlarged end of the body, the base and the enlarged end being spaced centrally thereof to provide a chamber between the body and the base, means for conducting fluid under pressure to the chamber through the base, a flexible substantially impervious diaphragm dividing said chamber and confining the fluid under pressure to one side of the diaphragm, means exerting a force on said diaphragm opposing the pressure, a latch in the form of a plunger having an inner end contacting the opposite side of the diaphragm, a cam member including an abutment to contact the opposite outer end of the plunger, said cam member being mounted upon the pivot of the projecting end of the body, a staff having one end fixed to the cam member, and a signal means attached to the staff, said plunger being longitudinally reciprocable in the body bore and being urged toward said diaphragm by said force opposing means so as to be moved to release the cam member and signal means when the pressure falls below a pre-determined minimum value.

2. A warning device comprising in combination, a body having a longitudinal bore and an enlarged end, a projecting end including a pivot, and a base to cover the enlarged end of the body, the base and the enlarged end being spaced centrally thereof to provide a chamber between the body and the base, means for conducting fluid under pressure to the chamber through the base, a flexible substantially impervious diaphragm dividing said chamber and confining the fluid under pressure to one side of the diaphragm, means exerting a force on said diaphragm opposing the pressure, a latch in the form of a plunger having an inner end contacting the opposite side of the diaphragm, a rotary member on the body pivot, a staff having one end fixed to the rotary member to extend transversely of the pivot, a signal means attached to the staff, the weight of the staff and signal means being sufficient to rotate the rotary member with an oscillating movement, and means cooperating with the outer end of the plunger to latch the rotary member against movement from an elevated inoperative position of the staff and signal means, to an operative lowered position thereof, as long as the diaphragm is under substantial pressure imposed by fluid in the body chamber, said plunger being longitudinally reciprocable in the body bore and being urged toward said diaphragm by said force opposing means so as to be moved to release the rotary member and signal means when the pressure falls below a pre-determined minimum value.

3. A warning device comprising in combination, a body having a longitudinal bore and an enlarged end, a projecting end including a pivot, and a base to cover the enlarged end of the body, the base and the enlarged end being spaced centrally thereof to provide a chamber between the body and the base, means for conducting fluid under pressure to the chamber through the base, a flexible substantially impervious diaphragm dividing said chamber and confining the fluid under pressure to one side of the diaphragm, means exerting a force on said diaphragm opposing the pressure, a latch in the form of a plunger having an inner end contacting the opposite side of the diaphragm, a rotary member on the body pivot, a staff having one end fixed to the rotary member to extend transversely of the pivot, a signal means attached to the opposite end of the staff, the weight of the staff and signal means being sufficient to rotate the rotary member with an oscillating movement, and an abutment on the rotary member cooperating with the outer end of the plunger to latch the rotary member against movement from an elevated inoperative position of the staff and signal means, to an operative lowered position thereof, as long as the diaphragm is under substantial pressure imposed by fluid in the body chamber, the rotary member having a volute periphery to urge the plunger toward the diaphragm upon rotation of the rotary member to the elevated inoperative position of the signal means following each release thereof by the plunger, said plunger being longitudinally reciprocable in the body bore and being urged toward said diaphragm by said force opposing means so as to be moved to release the rotary member and signal means when the pressure falls below a pre-determined minimum value.

4. In a warning device responsive to fluid pressure change, the combination of a latch, a latch keeper, a diaphragm housing having a diaphragm therein, means for delivering fluid pressure on one side of said diaphragm developing a force urging the latch to latching position with said keeper, a signal means normally held in a safe indicating position by the latch, and means exerting a force on said diaphragm opposing that of the pressure, said latch being actuated to a position to engage the latch keeper and hold the signal means in safe indicating position when the pressure exceeds a pre-determined minimum value and actuated by said force opposing means to release the latch from the keeper when the pressure falls below said pre-determined minimum value to release the signal means to unsafe indicating position.

5. A low pressure alarm comprising a pendulum having a latch keeper secured to the axis thereof, a latch for said keeper, a diaphragm housing having a diaphragm therein, means for delivering fluid pressure on one side of said diaphragm developing a force urging the latch to latching position with said keeper, and means exerting a force on said diaphragm opposing that of the pressure, said latch being actuated to a position to engage the latch keeper and hold the pendulum in safe indicating position when the pressure exceeds a predetermined minimum value and actuated by said force opposing means to release the latch from the keeper when the pressure falls below said pre-determined minimum value, thereby to release the pendulum to unsafe indicating position.

6. A low-pressure alarm comprising a diaphragm housing having a diaphragm therein, a pendulum pivoted upon the housing for free swinging movement from an elevated safe indicating position to a lowered unsafe indicating position, a latch, a latch keeper secured to the axis of the pendulum, means for delivering fluid pressure on one side of said diaphragm developing a force urging the latch to latching position with said keeper, and means exerting a force on said diaphragm opposing that of the pressure, said latch being actuated to a position to engage the latch keeper and hold the pendulum in the elevated safe indicating position when the pressure exceeds a predetermined minimum value and actuated by said force opposing means to disengage the latch from the keeper when the pressure falls below said predetermined minimum value thereby to release the pendulum for free swinging movement under the influence of gravity force.

7. A low-pressure alarm in accordance with claim 5 characterized by the fact that the latch keeper has a cam surface adapted to bear on said latch when the pendulum is in unsafe indicating position and urge the latch toward the diaphragm when the pendulum is raised from unsafe indicating position to safe indicating position, said diaphragm, when said predetermined minimum pressure is restored thereto, re-engaging the latch and latch keeper when said pendulum is returned to safe indicating position.

8. In a warning device responsive to fluid pressure change, the combination of a latch, a latch keeper, a diaphragm housing having a diaphragm therein, means for delivering fluid pressure on one side of said diaphragm developing a force urging the latch to latching position with said keeper, a signal means normally held in a safe indicating position by the latch, and means exerting a force on said diaphragm opposing that of the pressure, said latch being actuated to a position to engage the latch and hold the signal means in safe indicating position when the pressure exceeds a predetermined minimum value and actuated by said force opposing means to release the latch from the keeper when the pressure falls below said predetermined minimum value to release the signal means to unsafe indicating position, said diaphragm, when said predetermined minimum pressure is retored thereto, re-engaging the latch and latch keeper when said signal means is returned to safe indicating position.

9. A low pressure alarm comprising a latch, a latch keeper, a diaphragm housing having a diaphragm therein, means for delivering fluid pressure on one side of said diaphragm developing a force urging the latch to latching position with said keeper, a signal means normally held in a safe indicating position by the latch, spring means exerting a force on said diaphragm opposing that of the pressure, said latch being actuated to a position to engage the latch and hold the signal means in safe indicating position when the pressure exceeds a predetermined minimum value and actuated by said spring means to release the latch from the keeper when the pressure falls below said predetermined minimum value to release the signal means to unsafe indicating position.

ROBERT C. DALL.

REFERENCES CITED

The following references are of record in the file of this patent:

UNITED STATES PATENTS

| Number | Name | Date |
|---|---|---|
| 1,709,723 | Hill et al. | Apr. 16, 1929 |
| 1,862,569 | Gargan | June 14, 1932 |
| 1,926,180 | Rutherford | Sept. 12, 1933 |
| 2,341,538 | Grant | Feb. 15, 1944 |

FOREIGN PATENTS

| Number | Country | Date |
|---|---|---|
| 347,653 | Germany | Jan. 23, 1922 |